US011428836B2

(12) United States Patent
Mukhtarov et al.

(10) Patent No.: US 11,428,836 B2
(45) Date of Patent: Aug. 30, 2022

(54) DETERMINING EVENT CHARACTERISTICS OF MICROSEISMIC EVENTS IN A WELLBORE USING DISTRIBUTED ACOUSTIC SENSING

(71) Applicant: Halliburton Energy Services, Inc., Houston, TX (US)

(72) Inventors: Timur Mukhtarov, Calgary (CA); Henry Clifford Bland, Calgary (CA)

(73) Assignee: Halliburton Energy Services, Inc., Houston, TX (US)

(*) Notice: Subject to any disclaimer, the term of this patent is extended or adjusted under 35 U.S.C. 154(b) by 392 days.

(21) Appl. No.: 16/670,511

(22) Filed: Oct. 31, 2019

(65) Prior Publication Data

US 2021/0132247 A1    May 6, 2021

(51) Int. Cl.
*G01V 1/28* (2006.01)
*G01V 1/22* (2006.01)

(52) U.S. Cl.
CPC .............. *G01V 1/288* (2013.01); *G01V 1/226* (2013.01)

(58) Field of Classification Search
CPC ............................... G01V 1/288; G01V 1/226
See application file for complete search history.

(56) References Cited

U.S. PATENT DOCUMENTS 5,008,861 A * 4/1991 Gallagher ............. G01V 1/288
367/59
8,605,544 B1 * 12/2013 Baig ....................... G01V 1/40
367/57
9,075,155 B2 * 7/2015 Luscombe ............. G01V 1/226
9,702,244 B2    7/2017 Willis et al.
2017/0075002 A1 * 3/2017 Ranjan ................... E21B 49/00

FOREIGN PATENT DOCUMENTS

NO          314424 B1 *  3/2003 ............. G01V 1/286

OTHER PUBLICATIONS

Dean, et al, The Determination of the Seismic Quality Factor Q from VSP Data Acquired Using Distributed Acoustic Sensing, 79th EAGE Conference and Exhibition, pp. 1-5, 2017.
Dean, et al., Fibre Optic Based Vibration Sensing: Nature of the Measurement, Third EAGE Workshop on Borehole Geophysics, pp. 1-6, 2015.

* cited by examiner

*Primary Examiner* — Natalie Huls
*Assistant Examiner* — Sharad Timilsina
(74) *Attorney, Agent, or Firm* — Kilpatrick Townsend & Stockton LLP

(57) ABSTRACT

A well system includes a fiber optic cable positionable downhole along a length of a wellbore and a reflectometer communicatively coupleable to the fiber optic cable. The reflectometer detects and locates a microseismic event using strain detected in reflected optical signals received from the fiber optic cable. Further, the reflectometer computes a set of spectra for waveforms of the microseismic event. Additionally, the reflectometer aggregates each spectrum from the set of spectra that meet an acceptance threshold to generate an aggregate spectrum. Furthermore, the reflectometer applies a fault source model to the aggregate spectrum to determine a magnitude of the microseismic event.

19 Claims, 14 Drawing Sheets

DETERMINING EVENT CHARACTERISTICS OF MICROSEISMIC EVENTS IN A WELLBORE USING DISTRIBUTED ACOUSTIC SENSING

TECHNICAL FIELD

The present disclosure relates generally to using distributed acoustic sensors in downhole wellbore operations. More particularly, the present disclosure relates to a system that determines event characteristics of microseismic events within a wellbore using distributed acoustic sensors.

BACKGROUND

A well system (e.g., oil or gas) may include a wellbore drilled through a subterranean formation. The subterranean formation may include a rock matrix permeated by oil or gas that is to be extracted using the well system. Hydraulic fracturing operations performed on the subterranean formations may provide access to oil or gas that is located within the rock matrix. Further, the hydraulic fracturing operations may be controlled based on estimates of the magnitudes of microseismic events or the size of fractures generated by the microseismic events. The estimated microseismic information may be used to map fracture networks during a hydraulic fracturing operation.

An event magnitude of the microseismic events is obtained using geophone tools deployed during a wireline operation. Performing the wireline operation may be expensive and involve a significant amount of time. Methods of detecting seismic events with fiber optic recording operations suffer from challenges associated with directional sensitivity and noise of distributed acoustic sensors that result in frequency blind spots. Frequency blind spots in the fiber optic recording operations may limit the resolution of data generated by the distributed acoustic sensors.

DETAILED DESCRIPTION

Figure 1:
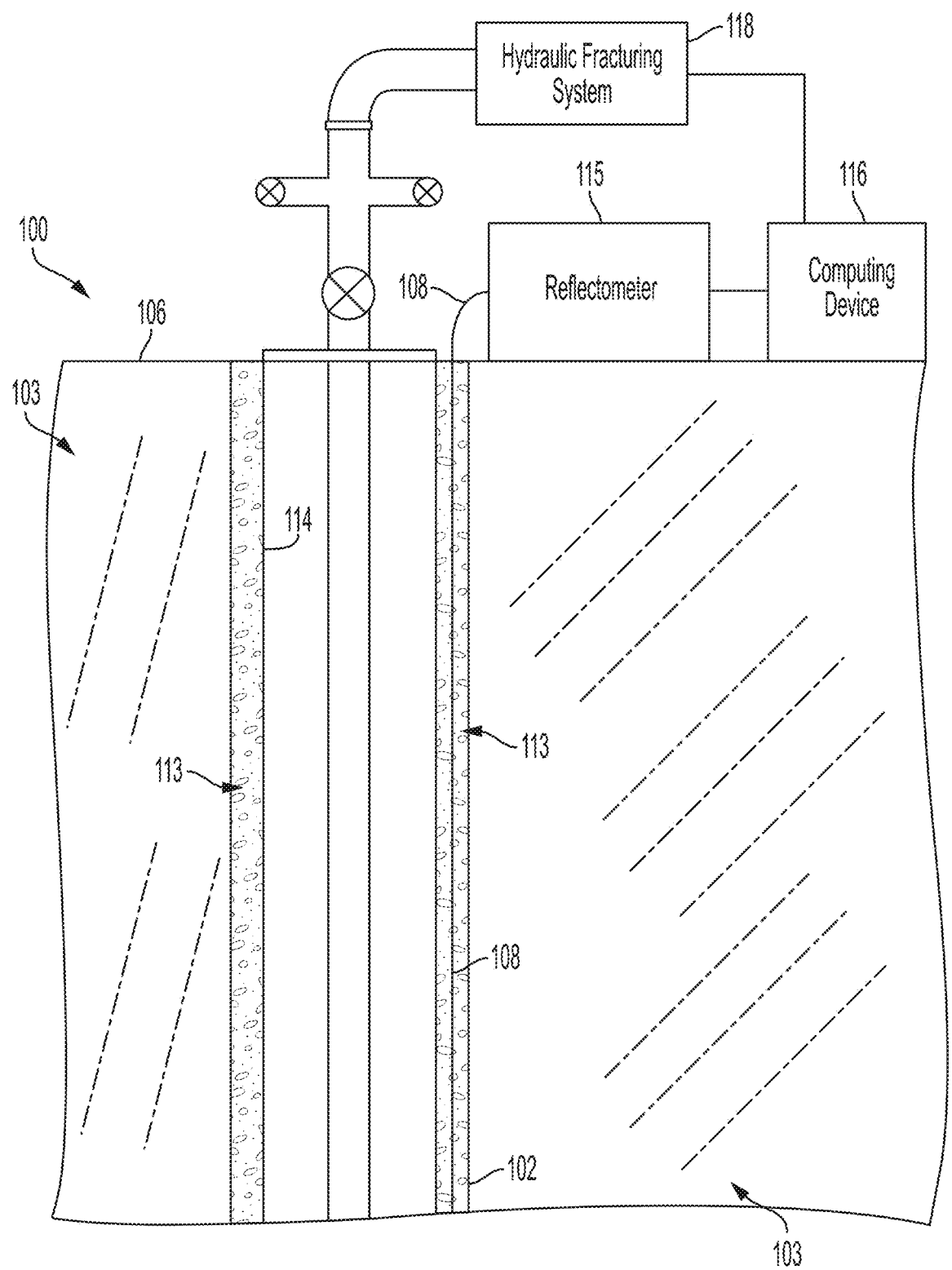
FIG. 1 is a schematic view of a well with a distributed acoustic sensor for detecting a microseismic event according to some aspects of the disclosure.

Certain aspects and features relate to wellbore measurements using distributed acoustic sensors to detect event magnitudes of microseismic events. Distributed acoustic sensors detect strain within a wellbore along a fiber optic cable resulting from the microseismic event. The microseismic event may include seismic activity within a formation surrounding the wellbore that results from a hydraulic fracturing operation, and the event magnitude may include a measurement of a strength of the microseism is event.

In an example, using the distributed acoustic sensors to detect event magnitudes of microseismic events may enable utilization of existing well system infrastructure (e.g., the distributed acoustic sensors) to produce measurements of microseismic events within the wellbore. This may lead to reduced time and costs associated with estimating microseismic event characteristics.

The disclosed subject matter may determine seismic moment, moment magnitude, and related attributes (i.e., event characteristics) of a microseismic event using spectral analysis of data obtained with distributed acoustic sensing. A fault source model, which may include a Brune circular crack model, and a displacement spectrum may be used for computation of the event characteristics of the microseismic event. Fault source models may include any seismic fault models that are able to identify event characteristics of a microseismic event based on a spectral analysis of data obtained with distributed acoustic sensing.

In an example, observed data is corrected for instrument response and other observation related effects. For example, distributed acoustic sensors may measure strain in a direction of a fiber optic cable of the distributed acoustic sensor. The directional measurement may result in a specific directional sensitivity. This directional sensitivity may be different for primary (P) waves and shear (S) waves. For example, a P wave sensitivity may change according to $\cos^2 \alpha$, and an S wave sensitivity may change according to $\sin 2\alpha$, where $\alpha$ is incidence angle of the P or S wave in relation to an axis of the optical fiber. Further, a wavenumber filtering effect of the observed data associated with the P and S waves may also be corrected. By correcting for the distributed acoustic sensor specific factors (e.g., the directional sensitivity and the wavenumber filtering effect), the corrected observed data may provide a more complete indication of the effect of the microseismic event on the distributed acoustic sensor. For example, an aggregate spectrum may be generated from the corrected observed data.

The aggregate spectrum may then be fit to the Brune circular crack model. Fitting the aggregate spectrum to the Brune circular crack model, or another fault source model, may enable a derivation of moment magnitude and related attributes from the observed data at the distributed acoustic sensor.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 schematically illustrates an example of a well system 100 that includes capability for estimating event magnitudes of microseismic events surrounding a wellbore 102 according to some aspects of the disclosure. The wellbore 102 may be created by drilling into a formation 103 (e.g., a hydrocarbon bearing formation). To access hydrocarbons stored within the formation 103, hydraulic fracturing operations may be conducted after the wellbore 102 is drilled. A hydraulic fracturing operation generally includes pumping hydraulic fracturing fluid under pressure into a section of the wellbore 102. The pressure of the hydraulic fracturing fluid creates fractures within the formation 103. Through these fractures, hydrocarbons are able to flow into the wellbore 102 more freely.

The well system 100 may include a length of fiber optic cable 108. As illustrated, the fiber optic cable 108 may be communicatively coupled to a reflectometer 115. In operation, the fiber optic cable 108 and the reflectometer 115 may be used to perform distributed acoustic sensing operations within the wellbore 102. For example, the fiber optic cable 108 and the reflectometer 115 may both be part of a distributed acoustic sensor (e.g., the reflectometer 115 may inject optical signals into the fiber optic cable 108 and detect variations in a reflection signal received from the fiber optic cable 108). In one or more examples, the reflectometer 115 is a coherent optical time domain reflectometer. The distributed acoustic sensing operations within the wellbore 102 may provide a mechanism to determine locations and event magnitudes of microseismic events caused by the hydraulic fracturing operations that result in the fractures within the formation 103.

The fiber optic cable 108 may be attached to an outer surface of a casing 114, or the fiber optic cable 108 may be suspended from a surface 106 of the wellbore 102 between the casing 114 and a wall of the wellbore 102 (e.g., within cement 113 between the casing 114 and the wall of the wellbore 102) or positioned within the casing 114. The reflectometer 115 may be communicatively coupled to a computing device 116. The reflectometer 115, the computing device 116, or both may be positioned at a surface 106 of the well system 100. In some examples, the reflectometer 115 may be an optical time-domain reflectometer. Any other types of reflectometers may also be used. The reflectometer 115 may detect acoustic events near the fiber optic cable 108 (e.g., vibration of the formation 103 resulting from seismic waves) that contribute to strain or displacement of the fiber optic cable 108.

In one example, the computing device 116 may be a computing device with a data acquisition system that can receive the output from the reflectometer 115 and process the output using various analysis and visualization tools. The computing device 116 may include a processor and a non-transitory computer-readable medium that includes instructions that are executable by the processor to perform various operations described herein with regard to FIGS. 1-17.

The distributed acoustic sensor, which may include the fiber optic cable 108, the reflectometer 115, and the computing device 116, is able to measure changes in strain along the fiber optic cable 108 at a number of locations along a length of the fiber optic cable 108. For example, the distributed acoustic sensor may measure changes in strain in 1 meter increments (i.e., 1 meter gauge lengths) along the length of the fiber optic cable 108. Other section lengths of the fiber optic cable 108 that are either larger or smaller than 1 meter are also contemplated. The distributed acoustic sensor may measure the changes in strain along the fiber optic cable 108 at a rate of 100 to 50,000 measurements per second. A resulting data stream is used in a processing algorithm to determine a unique location and an event magnitude of a microseismic event. The data stream may be represented as $\{\varepsilon_{\hat{d}\hat{d}}(x_r, t)\}_{N_r}$, where $\varepsilon$ is the strain, $\hat{d}=\hat{d}(x_r)$ is a direction of the fiber optic cable 108 at a location $x_r$, $N_r$ is a number of locations $x_r$, and r is a sequence of numbers from 1 to $N_r$. In an example where the fiber optic cable is 1000 meters in length, and the distributed acoustic sensor measures in 1 meter increments, the number of locations where the strain data is obtained (i.e., $N_r$) is equal to 1000.

In an example, a hydraulic fracturing system 118 may control a hydraulic fracturing operation that results in the microseismic event. As the computing device 116 locates the microseismic events and the event magnitudes of the microseismic events, the hydraulic fracturing system 118 may map locations and intensities of the microseismic events. Further, mapping the locations and intensities of the microseismic events may provide an operator of the hydraulic fracturing system 118 with an understanding of the efficiency of the hydraulic fracturing operation. Accordingly, the operator is able to adjust parameters of the hydraulic fracturing operation to improve hydraulic fracturing efficiency. For example, the hydraulic fracturing system 118 may control proppant concentrations in the hydraulic fluid, pumping rate of the hydraulic fluid, hydraulic fluid pressure, or any other hydraulic fracturing parameters to increase the hydraulic fracturing efficiency based on the locations and the event magnitudes of microseismic events.

Figure 2:
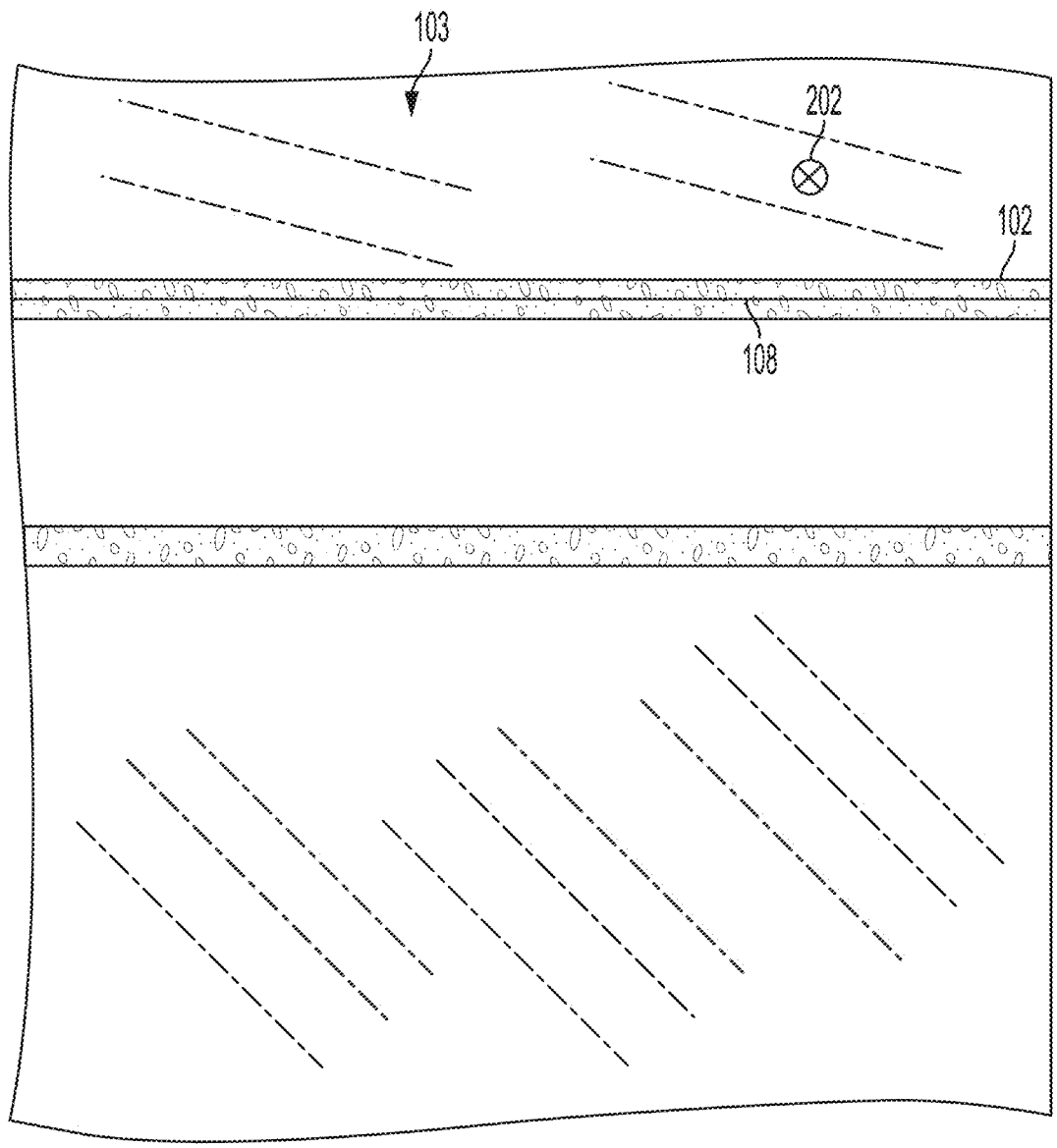
FIG. 2 is a schematic view of a horizontal section of a wellbore and a microseismic event according to some aspects of the disclosure.

FIG. 2 is a schematic view of a horizontal section of the wellbore 102 according to some aspects of the disclosure. While FIG. 2 is described and illustrated as a horizontal section of the wellbore 102, the description of FIG. 2 provided below is equally applicable to a vertical section of the wellbore 102. Further, in an example, the wellbore 102 may be a vertical wellbore that does not include a horizontal portion. As discussed above with respect to FIG. 1, the fiber optic cable 108 extends along a length of the wellbore 102. During a hydraulic fracturing operation, seismic waves originating from a microseismic event 202 may scatter or otherwise affect light pulses travelling within the fiber optic cable 108. In an example, the microseismic event 202 results in a fracture within the formation 103.

Without relying on additional fiber optic cables positioned within the wellbore 102 or positioned in neighboring wells, the reflectometer 115 and the computing device 116 may be able to estimate a unique location of the microseismic event 202. For example, a focal mechanism of the formation 103 may be used in combination with strain detected along the fiber optic cable 108 to identify a unique location of the microseismic event 202 (e.g., instead of a ring of possible locations surrounding the fiber optic cable 108). In an example, the focal mechanism describes a deformation in a source region that generates the seismic waves. The focal mechanism may vary depending on a location of the wellbore 102 within a field. Further, the focal mechanism may vary depending on where in the formation 103 surrounding the wellbore 102 the microseismic event 202 is detected. The focal mechanism may be identified based on known information about the formation 103. For example, an operator of the hydraulic fracturing equipment may know the focal mechanism of the formation 103 or focal mechanisms in varying regions of the formation 103 from general knowledge of the field in which the wellbore 102 resides. In knowing the focal mechanism, and using the focal mechanism to determine the unique location of the microseismic event 202, the location of the microseismic event 202 can be estimated even if a velocity field is homogeneous and isotropic, the distributed acoustic sensor collects data over a perfectly horizontal portion of the well, only an individual observation well is used, only an individual fiber optic cable is used, or any combination of these scenarios is present. Other techniques may also be used to determine a location of the microseismic event 202.

Once the location of the microseismic event 202 is determined, the measurements along the fiber optic cable 108 may be used to determine the event magnitude of the microseismic event. The measurements taken along the length of the fiber optic cable 108 result in a gauge length effect that has a frequency domain response consistent with that of a moving average filter. The effect of the moving average filter may depend on a gauge length (i.e., a length of a measurement section) of the fiber optic cable 108 and a wavelength or wavenumber of the received acoustic signal from the microseismic event 202. Because an apparent wavelength at a portion of the fiber optic cable 108 changes with an incidence angle of the seismic wave from the microseismic event 202, the filtering effect of the moving average filter also changes with the changes in the incidence angle at varying portions of the fiber optic cable 108.

By using a plurality of sensor sections along the fiber optic cable 108 with sufficient variability in incidence angle relative to the fiber optic cable 108, frequency ranges can be identified for each sensor section that can be effectively restored using root mean square (RMS) averaging over a range of sensors. The restoration of the frequency ranges over the range of sensors may enable reconstruction of a displacement spectrum. The displacement spectrum can be applied to a fault source model to estimate an event magnitude of the microseismic event 202, and the event magnitude estimation may be used, for example, to analyze and control a hydraulic fracturing process performed by the hydraulic fracturing system 118 within the wellbore 102.

As illustrated in FIG. 2, the wellbore 102 may have a horizontal portion, while in other configurations, the wellbore 102 may include only a vertical portion. Further, the fiber optic cable 108 may be positioned within a well that runs near a separate well undergoing a hydraulic fracturing operation. For example, the fiber optic cable 108 may be located in a well that is within 100 to 2000 feet of the well undergoing the hydraulic fracturing operation such that the well including the fiber optic cable 108 is able to interact with the seismic waves of the microseismic event 202 generated by the hydraulic fracturing operation of the other well.

Figure 3:
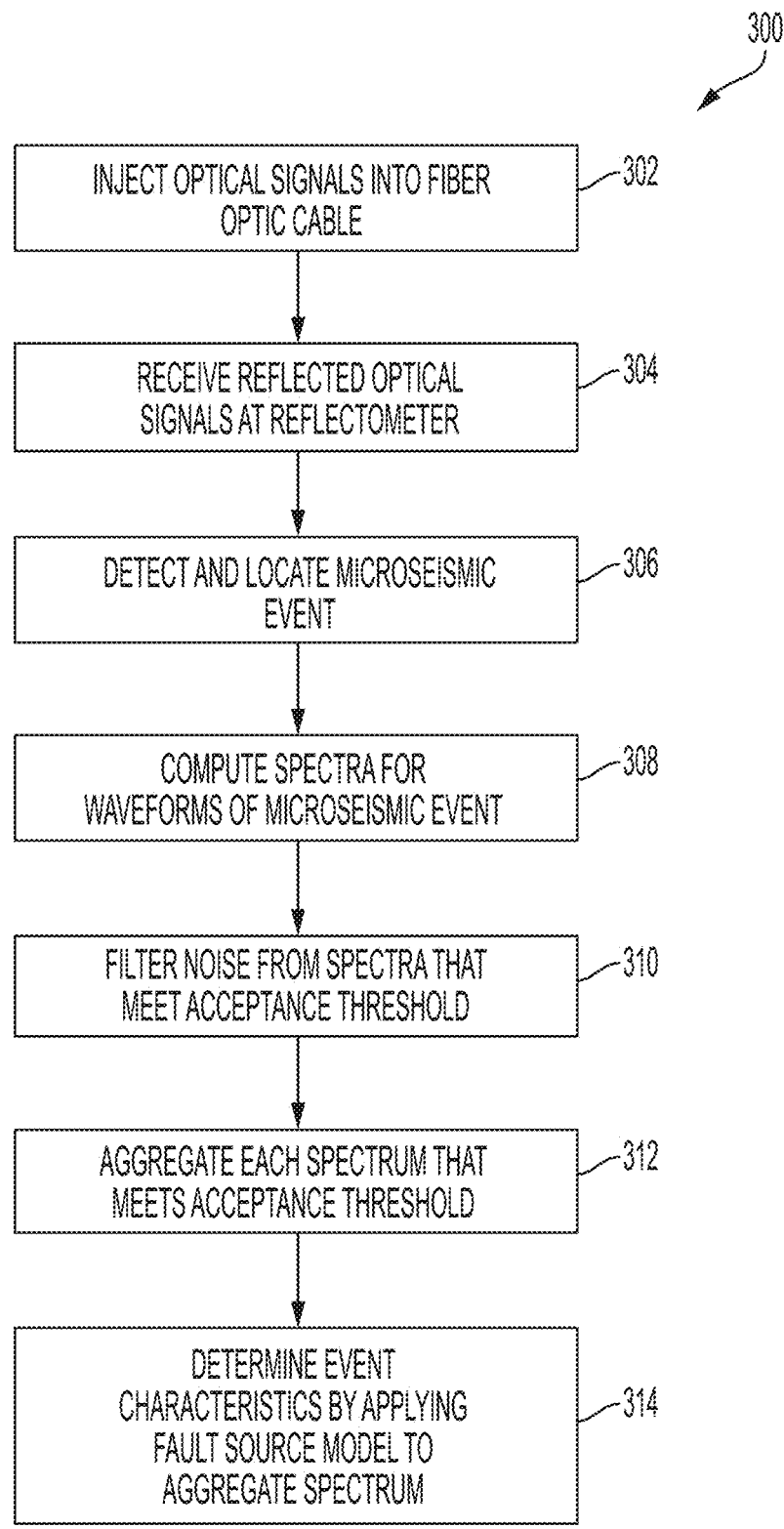
FIG. 3 is flowchart of a process for estimating event characteristics of a microseismic event according to some aspects of the disclosure.

FIG. 3 is a process 300 for estimating an event magnitude of the microseismic event 202 according to certain aspects of the disclosure. At block 302, the process 300 involves injecting optical signals into the fiber optic cable 108. In an example, the reflectometer 115 injects light pulses into the fiber optic cable 108. An interaction between the fiber optic cable 108 and seismic waves associated with the microseismic event 202 interferes with the light pulses.

At block 304, the process 300 involves receiving reflected optical signals at the reflectometer 115. The reflected optical signals received by the reflectometer 115 may include the light pulses that have been affected by the seismic waves of the microseismic event 202 interacting with the fiber optic cable 108. Using the reflected signals received at the reflectometer 115, the computing device 116 is able to read strain on the fiber optic cable 108, displacement of the fiber optic cable 108, or both at varying locations resulting from the microseismic event 202.

At block 306, the process 300 involves detecting and locating the microseismic event 202 based on the strain on the fiber optic cable 108, the displacement of the fiber optic cable 108, or both. As discussed above with respect to FIG. 2, a focal mechanism of the formation 103 may be used in combination with strain detected along the fiber optic cable 108 to identify a unique location of the microseismic event 202 (e.g., instead of a ring of possible locations surrounding the fiber optic cable 108). Other techniques may also be used to identify a location of the microseismic event 202.

At block 308, the process 300 involves computing a spectra for waveforms of the microseismic event 202. The spectra for the waveforms of the microseismic event 202 may include an indication of seismic wave amplitude over a range of frequencies using the seismic waves detected at multiple sensor sections of the fiber optic cable 108. In some examples, the spectra includes an indication of both P waves and S waves of the microseismic event 202.

At block 310, the process 300 involves filtering noise from the spectra that meet an acceptance threshold. In an example, the strain information detected from the fiber optic cable 108 is filtered with a filter operator depending on an apparent wavelength and incident angle of the seismic wave at a sensor section of the fiber optic cable 108. The following equation may represent the filter operator:

$$R(f, v, \alpha) = \frac{1}{L} \left| \frac{\sin\left(\frac{\pi L}{\lambda_a}\right)}{\sin\left(\frac{\pi}{\lambda_a}\right)} \right|, \text{ where } \lambda_a = \frac{v}{f \cos(\alpha)} \quad \text{(Equation 1)}$$

where L is the gauge length of a sensor section of the fiber optic cable 108, f is a frequency of the detected seismic wave, v is a seismic velocity of the seismic wave, α is the incident angle of the seismic wave at the sensor section (which is determined using the location of the microseismic event 202), and $\lambda_\alpha$ is the apparent wavelength of the seismic wave. In general, the inverse of Equation 1 may be referred to as a recovery factor.

The distributed acoustic sensor system may be directionally sensitive along the fiber optic cable 108. For example, a P wave of the microseismic event 202 may be subject to measurement sensitivity that changes according to $\cos^2 \alpha$ (e.g., as depicted below with respect to FIG. 5), and an S or SH wave of the microseismic event 202 may be subject to measurement sensitivity that changes according to $\sin 2\alpha$ (e.g., as depicted below with respect to FIG. 6), where $\alpha$ is the incident angle of the seismic wave at a sensor section of the fiber optic cable 108. Equation 1 represents a moving average filter where an averaging base changes with the incident angle $\alpha$. A moving average filter frequency response has periodic notches where a signal is eliminated. Since the averaging base effectively changes with the incident angle $\alpha$, a cut-off frequency and periodicity of notches change as well. Thus, certain frequencies at certain incident angles may generate poor or non-existent signals representing the seismic wave of the microseismic event 202. To avoid inclusion of these poor signals when combining spectra from multiple sensor sections of the fiber optic cable 108, using knowledge about seismic velocity, DAS array placement and orientation, microseismic event location, and gauge length, frequencies for a given event that will have poor signal can be predicted and corresponding data can be removed from the analysis.

By utilizing a plurality of sensor sections of the fiber optic cable 108, negative directional sensitivity and wavenumber effects are mitigated because each of the sensor sections includes a different incident angle. Thus, each sensor section has a different directional sensitivity and wavenumber effect, which result in different frequencies where signals detected by the fiber optic cable 108 are of poor quality. Further, in some examples, P and S wave spectra can be scaled and combined in the event of a poor signal to noise ratio, inadequate angular coverage, or both by taking advantage of the different directional sensitivities of P and S waves.

For each sensor section of the distributed acoustic sensing record, noise may be analyzed in a preceding window and subtracted from the signal for both P and S waves. The spectrum for each frequency is then analyzed across the different sensor sections, and if a spectrum value and a corresponding recovery factor for the sensor section pass an acceptance threshold, the spectrum value is added to an RMS averaging pool for that frequency. If a spectrum value for a sensor section and frequency does not pass the acceptance threshold, then the spectrum value for that sensor section and frequency is omitted from further analysis. The acceptance threshold may be determined by analyzing a noise floor of a recording system and a signal to noise ratio of an event. Additionally, the acceptance threshold may be determined using trial and error by changing the acceptance threshold and examining an inversion error at every step.

At block 312, the process 300 involves aggregating each spectrum that meets the acceptance threshold. This is accomplished by adding the spectra that meet the acceptance threshold to the RMS averaging pool for the associated frequencies. The result is an aggregate spectrum based on measurements from multiple sensor sections of the fiber optic cable 108.

At block 314, the process 300 involves determining event characteristics of the microseismic event 202 by applying a fault source model to the aggregate spectrum. The fault source model may include any seismic fault models that are able to identify event characteristics of a microseismic event based on a spectral analysis of data obtained with distributed acoustic sensing. In an example, the fault source model may be a Brune circular crack model (i.e., a Brune model or Brune spectrum model). The Brune circular crack model may be used to compute a seismic moment, an event magnitude, a corner frequency, and other related attributes for the microseismic event 202. A Brune displacement spectrum of the Brune circular crack model may be defined by the following equation:

$$\Omega(f) = \frac{\Omega_0}{1 + \left(\frac{f}{f_c}\right)^n} \quad \text{(Equation 2)}$$

where $\Omega_0$ is a low frequency level of a displacement spectrum and is equal to the area under a displacement pulse, f is a frequency, $f_c$ is a corner frequency, and n is a falloff slope where a greater value means steeper slope. In the Brune circular crack model n=2, but n values up to 3 may be appropriate for some small microseismic events.

The aggregate spectrum is fit to the Brune circular crack model to calculate the event characteristics of the microseismic event. A fitting algorithm may include a grid search that attempts a range of values for low frequency level of the displacement spectrum $\Omega_0$ and the corner frequency $f_c$, computing a model spectrum at each step and matching the model spectrum until a best fit is found. For example, the low frequency level of the displacement spectrum $\Omega_0$ is associated with the event magnitude of the microseismic event 202, and the corner frequency $f_c$ of the aggregate spectrum fit to the Brune circular crack model is associated with a size of the shear failure of the microseismic event 202. In an example, the estimated low frequency level of the displacement spectrum $\Omega_0$ and the estimated corner frequency $f_c$ may be used to estimate the event seismic moment, the moment magnitude, and the size of the shear failure of the microseismic event 202 using the following equations:

$$M_0 = \frac{4\pi\rho V^3 R\Omega_0}{U_{\Phi\Theta}} \quad \text{(Equation 3)}$$

$$M = \frac{2}{3}(\log_{10} M_0 - 9.1) \quad \text{(Equation 4)}$$

$$r = \sqrt{\frac{7\pi}{4}} \frac{V}{2\pi f_c} \quad \text{(Equation 5)}$$

where $M_0$ is the seismic moment, M is moment magnitude, r is a radius of the shear failure, $f_c$ is the corner frequency, $\rho$ is rock density, R is a travel distance from the event to receivers, V is a seismic velocity, $\Omega_0$ is the low frequency level of the displacement spectrum, $U_{\Phi\Theta}$ is a radiation pattern.

Once the event characteristics are determined at block 314, the computing device 116 may control a hydraulic fracturing operation of the hydraulic fracturing system 118. For example, the computing device 116 may adjust parameters of the hydraulic fracturing operation to improve hydraulic fracturing efficiency. The adjustable parameters may include proppant concentrations in the hydraulic fluid, pumping rate of the hydraulic fluid, hydraulic fluid pressure, or any other hydraulic fracturing parameters capable of improving hydraulic fracturing efficiency based on the estimated event characteristics of microseismic event 202.

Figure 4:
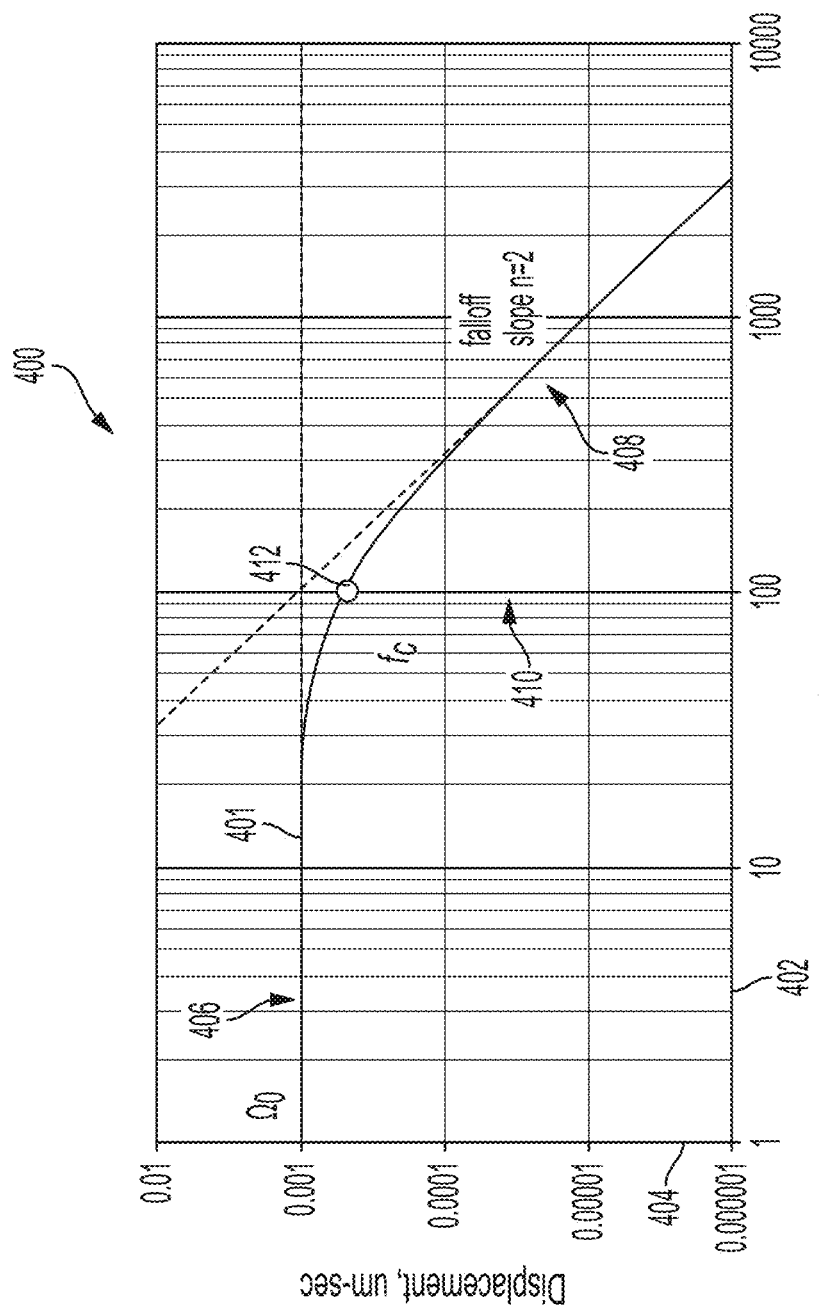
FIG. 4 is a plot of a Brune spectrum model according to some aspects of the disclosure.

FIG. 4 is a plot 400 of the Brune spectrum model 401 described above with respect to FIG. 3 according to some aspects of the disclosure. The plot 400 includes an abscissa 402 that is a logarithmic representation of frequency in Hz, and an ordinate 404 that represents displacement of a fiber optic cable. The Brune spectrum model 401, which is defined above by Equation 2, includes a low frequency level 406 of a displacement spectrum, a falloff slope 408, and a corner frequency 410, which is located where a slope of the falloff slope 408 and a slope of the low frequency level 406 intersect (i.e., at point 412).

Figure 5:
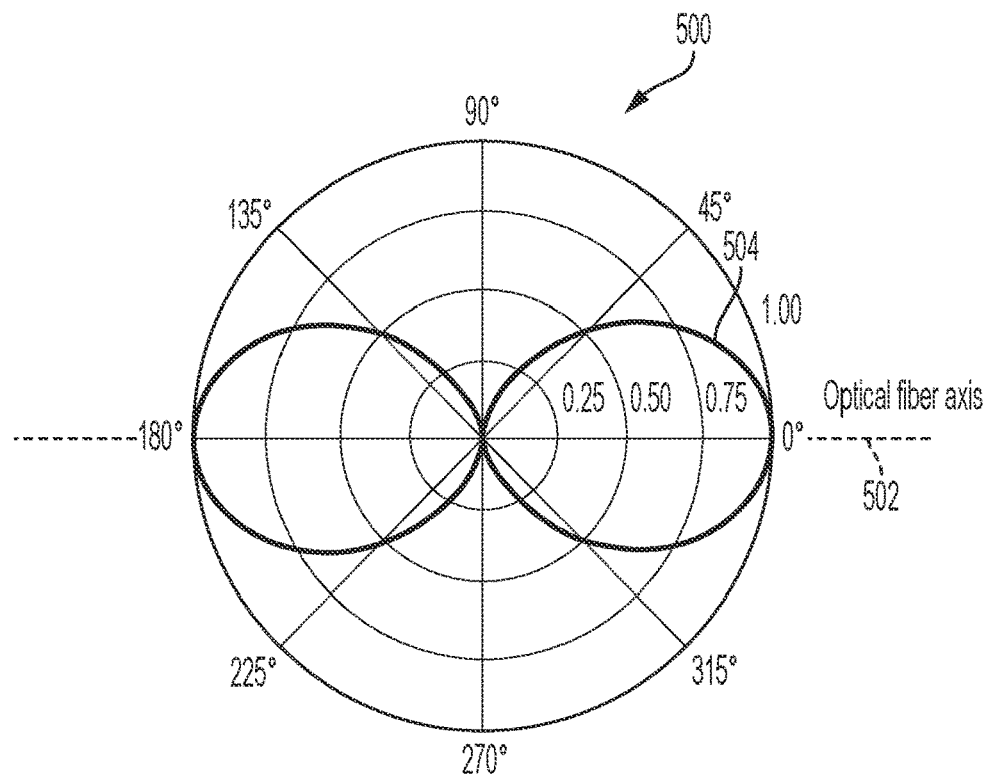
FIG. 5 is a plot of directional sensitivity of a P wave on a fiber optic cable of a distributed acoustic sensor according to some aspects of the disclosure.

FIG. 5 is a plot 500 of directional sensitivity of a P wave along an axis 502 of the fiber optic cable 108 of a distributed acoustic sensor according to some aspects of the disclosure. The sensitivity is represented by a line 504 following a path of $\cos^2 \alpha$ where $\alpha$ is the incident angle of the seismic wave at the sensor section of the fiber optic cable 108. As illustrated, the signal strength is greatest at 0 degrees and 180 degrees from the axis 502, and the signal strength is weakest (e.g., is effectively missing) at 90 degrees and 270 degrees from the axis 502.

Figure 6:
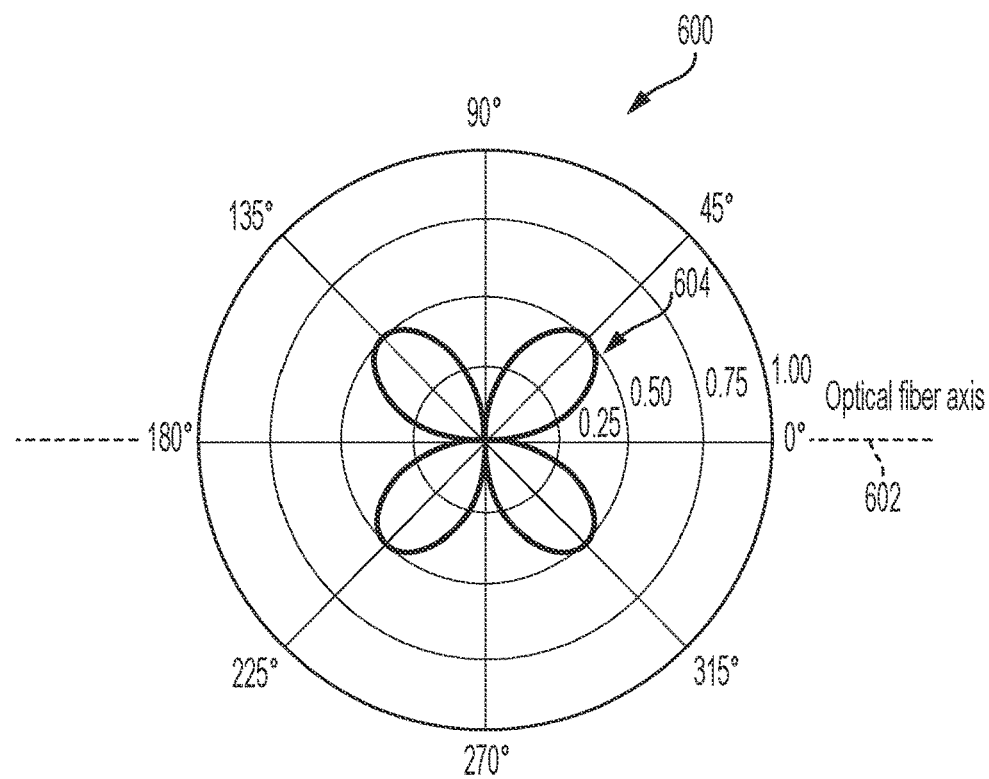
FIG. 6 is a plot of directional sensitivity of an S wave on a fiber optic cable of a distributed acoustic sensor according to some aspects of the disclosure.

FIG. 6 is a plot 600 of directional sensitivity of an S wave along an axis 602 of the fiber optic cable 108 of a distributed acoustic sensor according to some aspects of the disclosure. The sensitivity is represented by a line 604 following a path of sin 2a where a is the incident angle of the seismic wave at the sensor section of the fiber optic cable 108. As illustrated, the signal strength is greatest at 45 degrees, 135 degrees, 225 degrees, and 315 degrees from the axis 602. The signal strength is weakest (e.g., is effectively missing) at 0 degrees, 90 degrees, 180 degrees, and 270 degrees from the axis 502.

Figure 7:
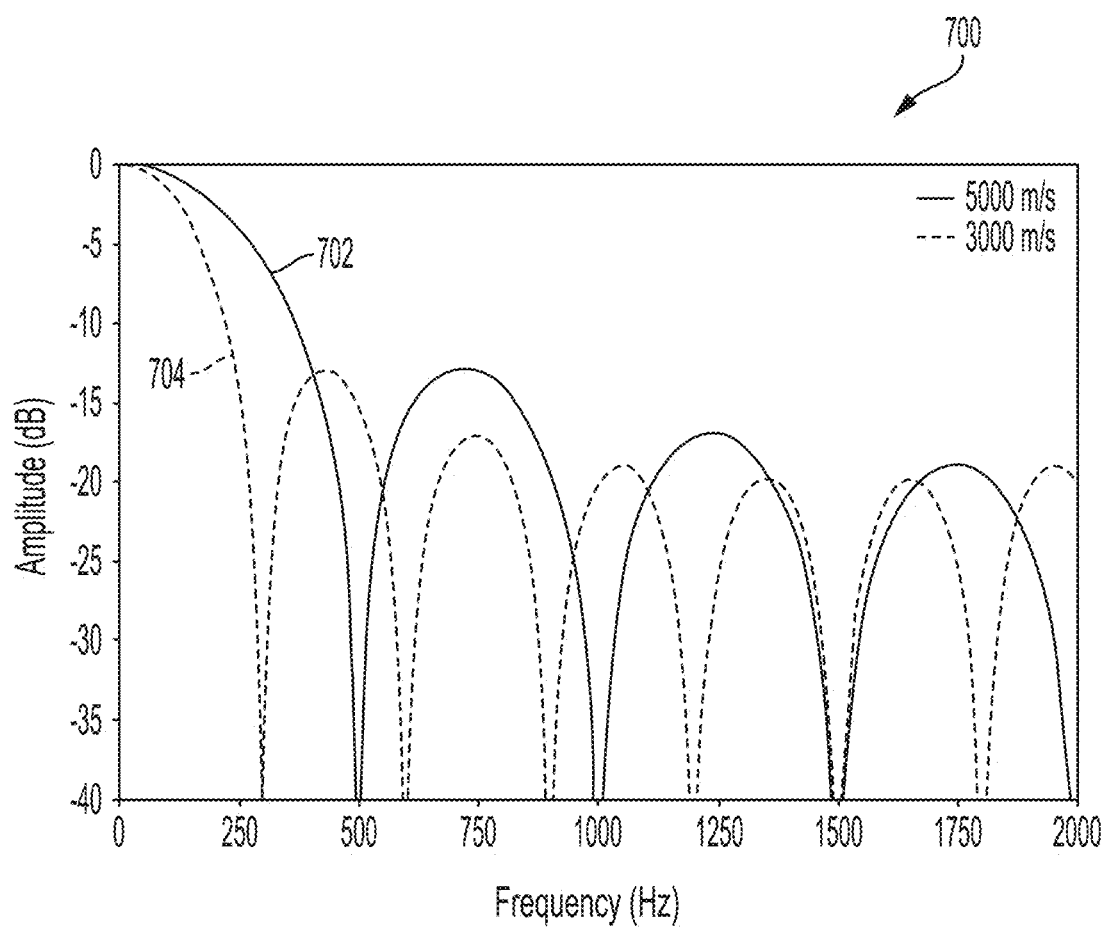
FIG. 7 is a plot of a distributed acoustic sensor response according to some aspects of the disclosure.

FIG. 7 is a plot 700 of a distributed acoustic sensor response to a seismic wave at varying frequencies according to some aspects of the disclosure. As illustrated, the incident angle between the sensor section of the fiber optic cable 108 and the seismic wave is 0 degrees. A line 704 represents a faster P wave of the seismic wave, and a line 702 represents a slower S wave of the seismic wave.

In addition to the directional sensitivity of the fiber optic cable 108 described above with respect to FIGS. 5 and 6, a wavenumber filtering effect may also diminish signal strength at the fiber optic cable 108. For example, the fiber optic cable 108 may include sensing gaps at frequency intervals that are equal to a velocity of the P or S wave divided by a length of a sensor section of the fiber optic cable 108. The P wave is illustrated as travelling at 5000 m/s, and the length of the sensor section is 10 meters. Accordingly, the fiber optic cable 108 may have sensing gaps at 500 Hz, 1000 Hz, 1500, Hz, 2000 Hz, etc. for the P wave. Similarly, the S wave, which is illustrated as travelling at 3000 m/s, may have sensing gaps at 300 Hz, 600 Hz, 900 Hz, etc.

Figure 8:
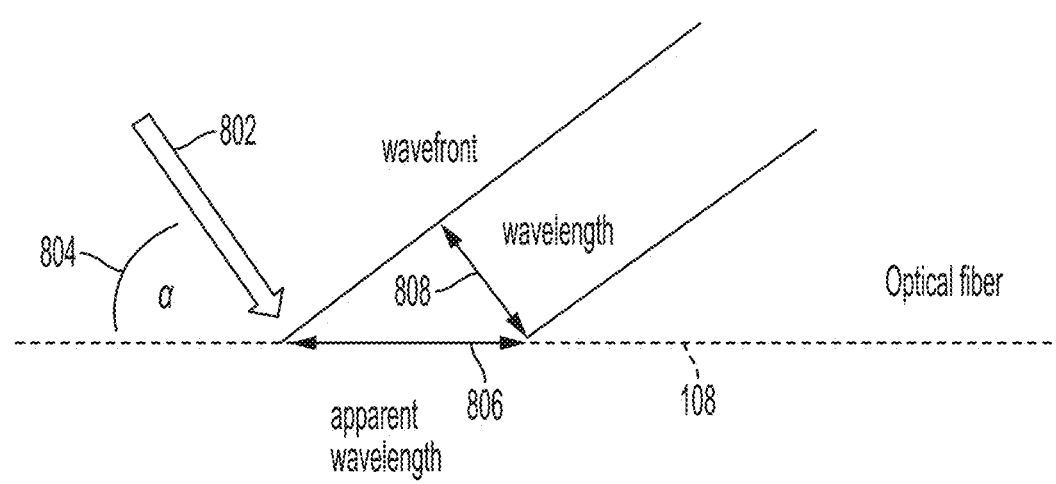
FIG. 8 is a schematic view of a seismic wave arriving at a fiber optic cable according to some aspects of the disclosure.

FIG. 8 is a schematic view of a seismic wave 802 arriving at the fiber optic cable 108 according to some aspects of the disclosure. Because the seismic wave 802 arrives at the fiber optic cable 108 with an incident angle 804, an apparent wavelength 806 of the seismic wave 802 is different from an actual wavelength 808 of the seismic wave 802. The apparent wavelength 806 is calculated with the following equation:

$$\lambda_a = \frac{v}{f \cos \alpha}.$$ (Equation 6)

The apparent wavelength 806 is used in the filter operator defined by Equation 1 to determine signals that are not adequate for use in the aggregate spectrum applied to the Brune model.

Figure 9:
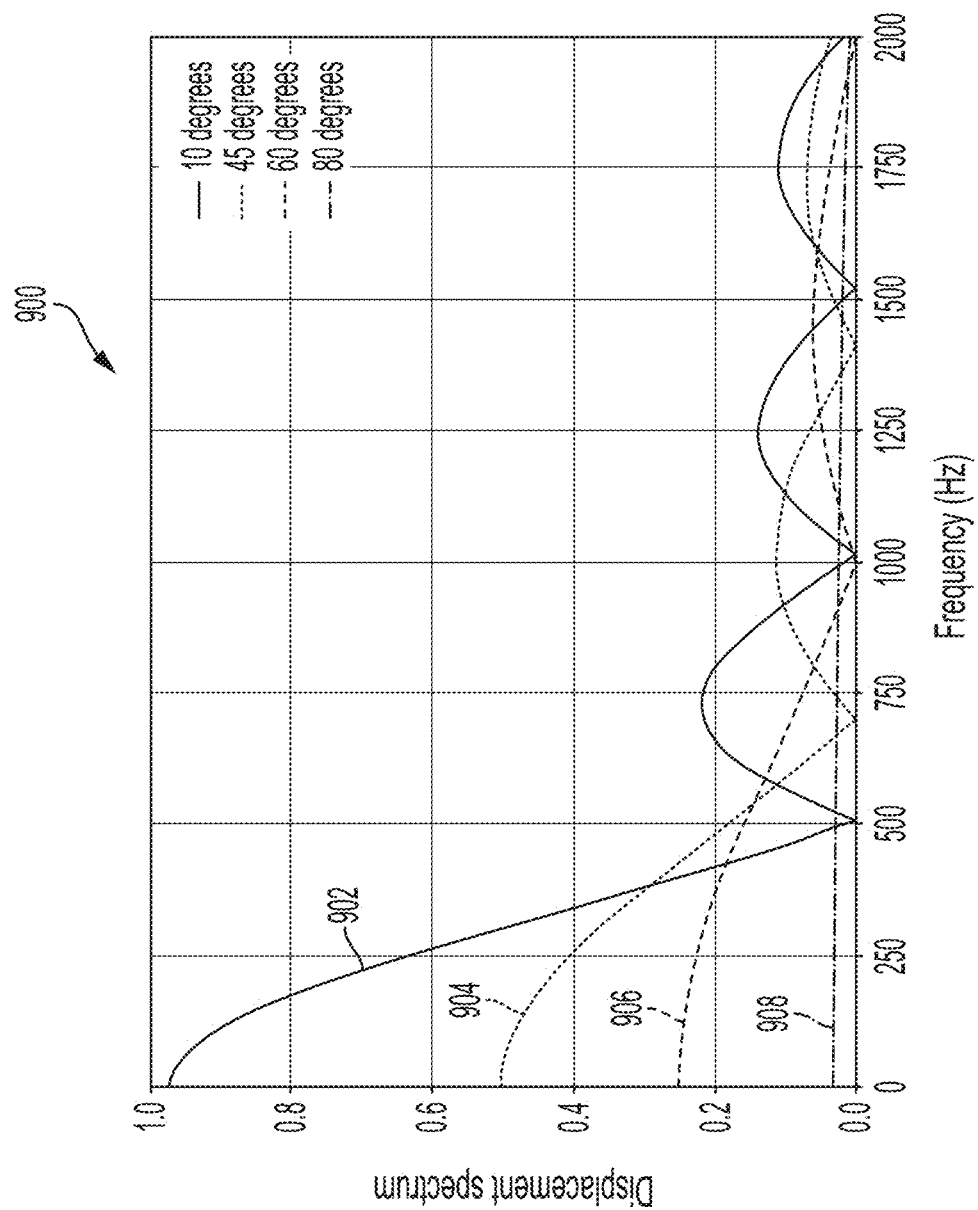
FIG. 9 is a plot of a P wave combined sensitivity and wavenumber filtering effect depending on an angle of incidence of the P wave at a fiber optic cable according to some aspects of the disclosure.

FIG. 9 is a plot 900 of a P wave with a combined directional sensitivity and wavenumber filtering effect depending on an angle of incidence of the P wave at a fiber optic cable 108 according to some aspects of the disclosure. A line 902 represents signal strength of the P wave at various frequencies received at an incident angle of 10 degrees, a line 904 represents the signal strength of the P wave at various frequencies received at an incident angle of 45 degrees, a line 906 represents the signal strength of the P wave at various frequencies received at an incident angle of 60 degrees, and a line 908 represents the signal strength of the P wave at various frequencies received at an incident angle of 80 degrees. As the incident angles of the lines 902, 904, 906, and 908 approach 90 degrees, the magnitude of the signal decreases, as in the shape of the line 504 depicted in FIG. 5. Further, the wavenumber filtering effect, which results in signal gaps at varying frequencies based on the gauge length of a sensor section of the fiber optic cable 108, is also dependent upon the incident angle due to the apparent wavelengths 806 of the seismic wave 802 received at different incident angles along the fiber optic cable 108.

Figure 10:
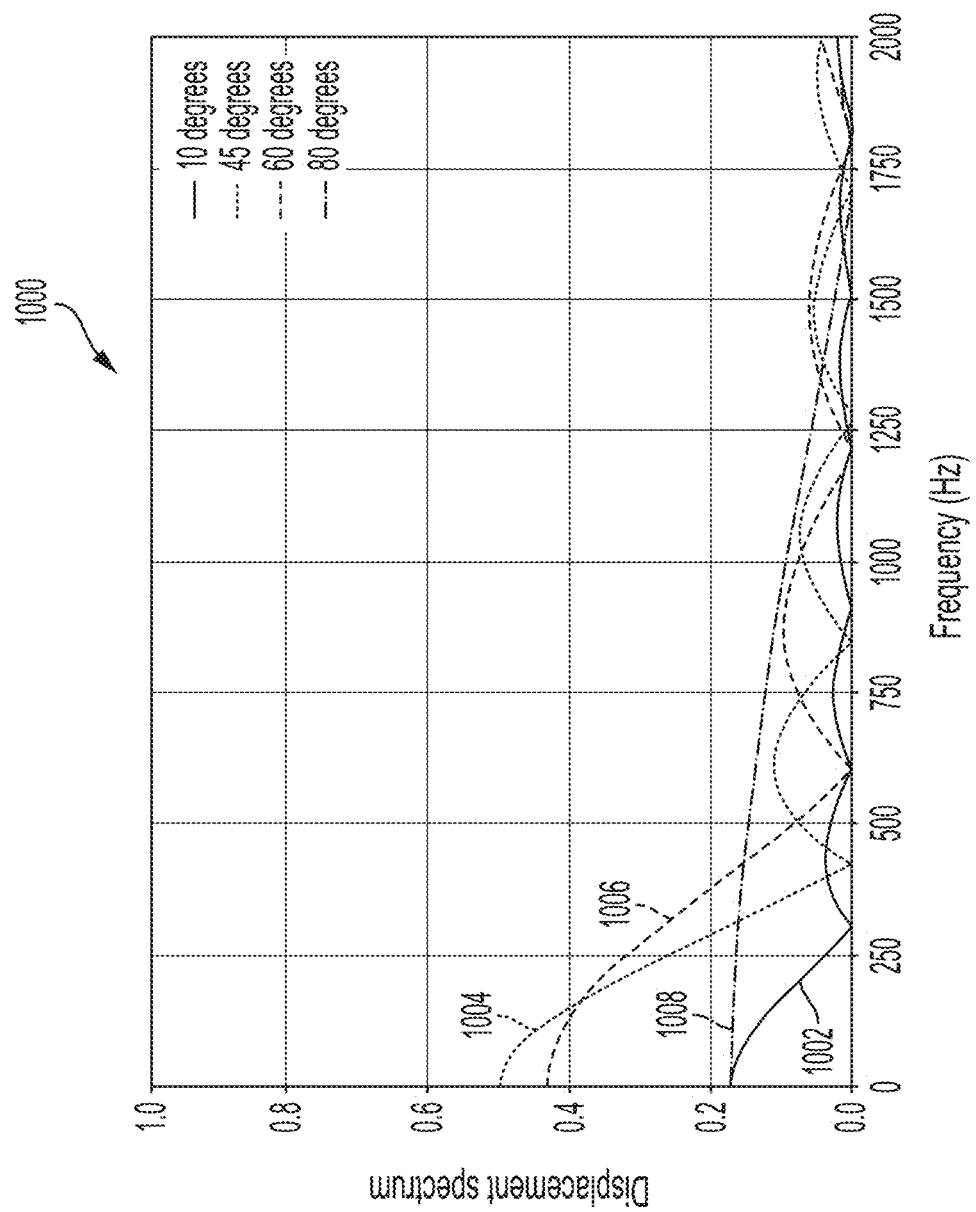
FIG. 10 is a plot of an S wave combined sensitivity and wavenumber filtering effect depending on an angle of incidence of the S wave at a fiber optic cable according to some aspects of the disclosure.

FIG. 10 is a plot 1000 of an S wave combined sensitivity and wavenumber filtering effect depending on an angle of incidence of the S wave at the fiber optic cable 108 according to some aspects of the disclosure. A line 1002 represents signal strength of the S wave at varying frequencies received at an incident angle of 10 degrees, a line 1004 represents the signal strength of the S wave at various frequencies received at an incident angle of 45 degrees, a line 1006 represents the signal strength of the S wave at various frequencies received at an incident angle of 60 degrees, and a line 1008 represents the signal strength of the S wave at various frequencies received at an incident angle of 80 degrees. The signal strengths of the lines 1002, 1004, 1006, and 1008 track the shape of the line 604 of FIG. 6 with respect to the associated incident angles. For example, the line 1004 with an incident angle of 45 degrees has the greatest signal strength, while the lines 1002 and 1008 with incident angles of 10 and 80 degrees, respectively, have the smallest signal strength. Further, the wavenumber filtering effect, which results in signal gaps at varying frequencies based on the gauge length of a sensor section of the fiber optic cable 108, is also dependent upon the incident angle due to the apparent wavelengths 806 of the seismic wave 802 received at different incident angles along the fiber optic cable 108.

Figure 11:
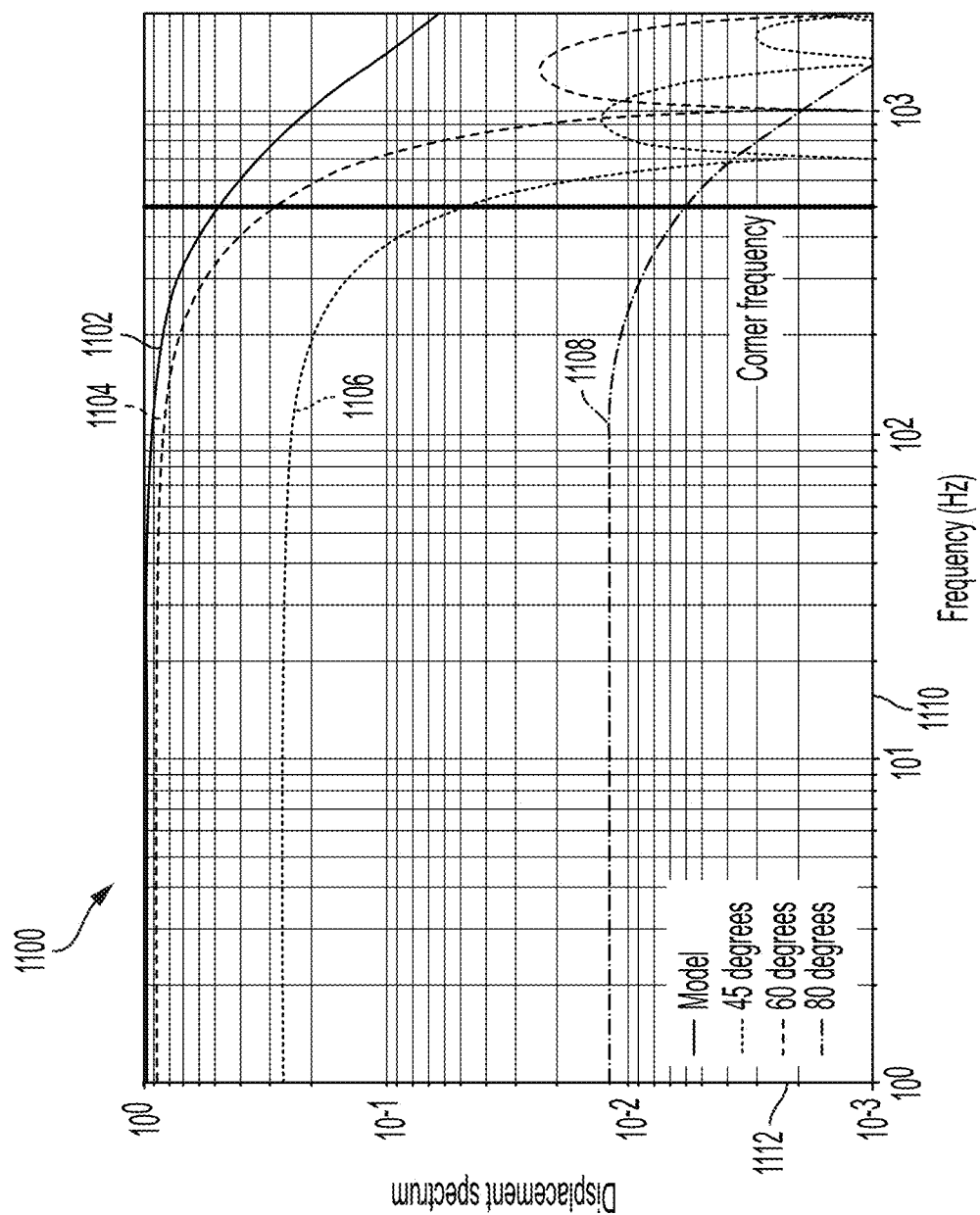
FIG. 11 is a plot of a Brune spectrum model and distributed acoustic sensor responses for a P wave at different angles of incidence according to some aspects of the disclosure.

FIG. 11 is a plot 1100 of a Brune spectrum model 1102 and distributed acoustic sensor responses represented by lines 1104, 1106, and 1108 for a P wave at different angles of incidence according to some aspects of the disclosure. The plot 1100 includes an abscissa 1110 that is a logarithmic representation of frequency in Hz, and an ordinate 1112 that represents a displacement spectrum of a fiber optic cable. The line 1104 represents a distributed acoustic sensor response at an incident angle of 60 degrees, the line 1106 represents a distributed acoustic sensor response at an incident angle of 45 degrees, and the line 1108 represents a distributed acoustic sensor response at an incident angle of 80 degrees.

Figure 12:
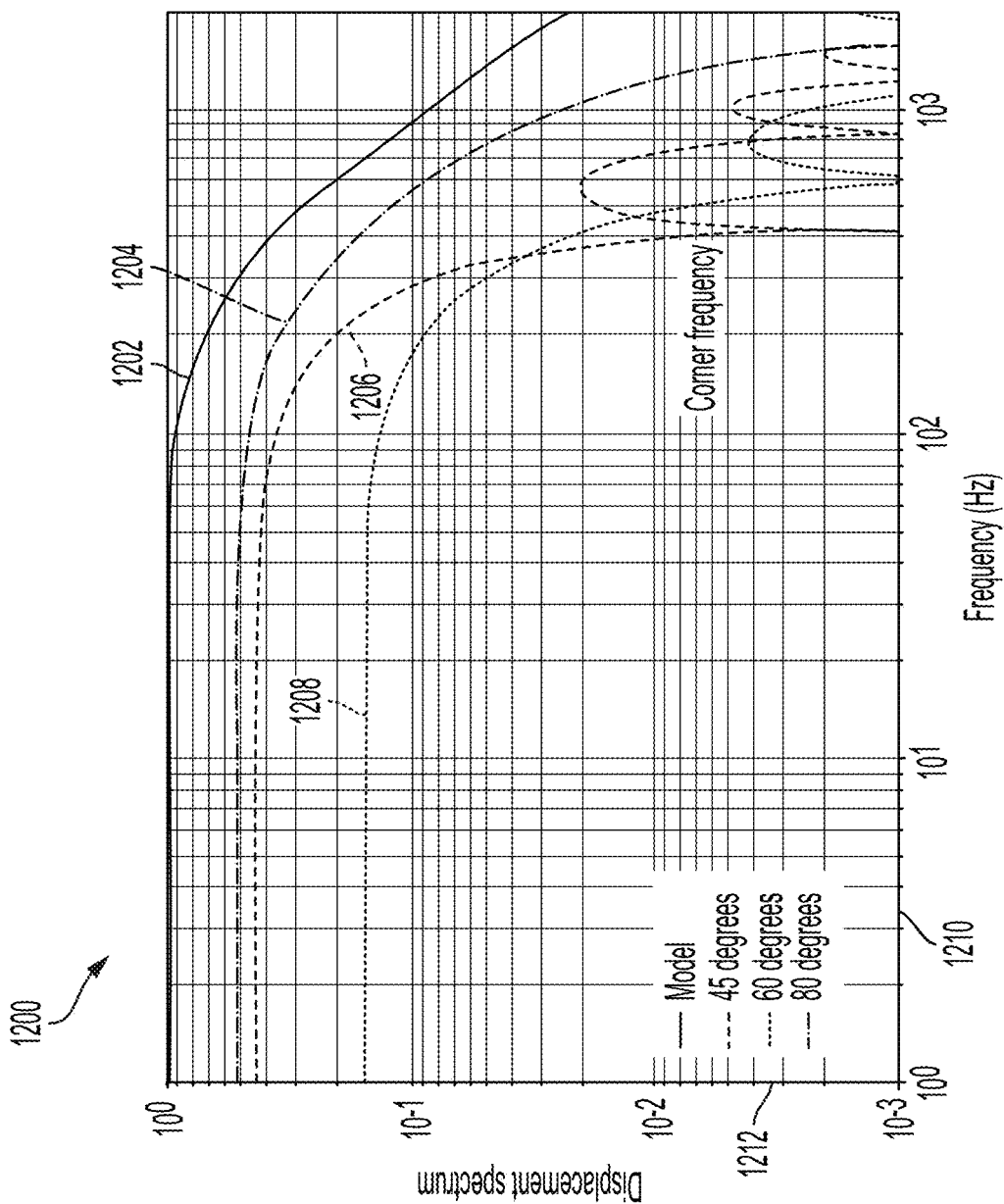
FIG. 12 is a plot of a Brune spectrum model and distributed acoustic sensor responses for an S wave at different angles of incidence according to some aspects of the disclosure.

FIG. 12 is a plot 1200 of a Brune spectrum model 1202 and distributed acoustic sensor responses represented by lines 1204, 1206, and 1208 for an S wave at different angles of incidence according to some aspects of the disclosure. The plot 1200 includes an abscissa 1210 that is a logarithmic representation of frequency in Hz, and an ordinate 1212 that represents a displacement spectrum of a fiber optic cable. The line 1204 represents a distributed acoustic sensor response at an incident angle of 80 degrees, the line 1206 represents a distributed acoustic sensor response at an incident angle of 45 degrees, and the line 1208 represents a distributed acoustic sensor response at an incident angle of 60 degrees.

Figure 13:
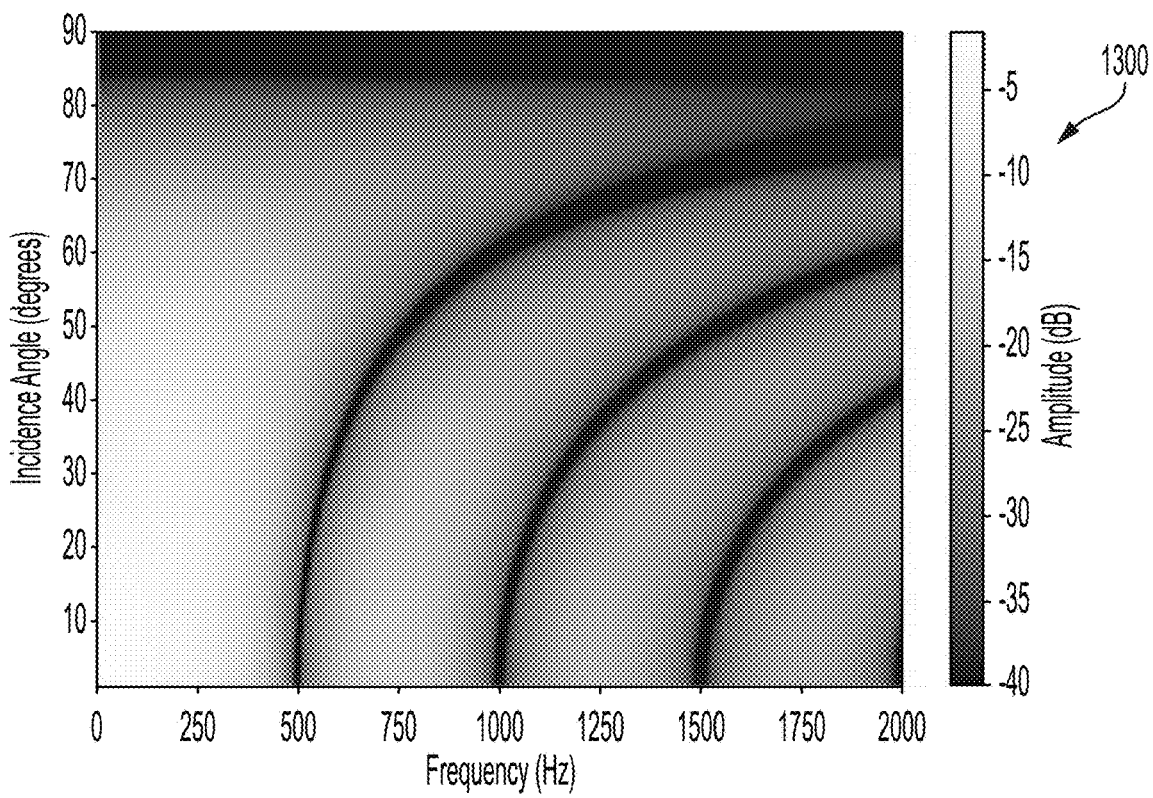
FIG. 13 is an amplitude plot of a combined sensitivity and wavenumber filtering effect of a distributed acoustic sensor response for a P wave according to some aspects of the disclosure.

FIG. 13 is an amplitude plot 1300 of a combined sensitivity and wavenumber filtering effect of a distributed acoustic sensor response for a P wave according to some aspects of the disclosure. As illustrated, lighter areas of the amplitude plot 1300 indicate incidence angles and frequencies that provide high quality responses to the microseismic event 202, while the darker areas of the amplitude plot 1300 indicate incidence angles and frequencies that provide lower quality responses to the microseismic event 202. In operation, the computing device 116 may filter out responses from the distributed acoustic signal that fall within the darker areas of the amplitude plot 1300 when generating the aggregate spectrum that is fit to the Brune model.

Figure 14:
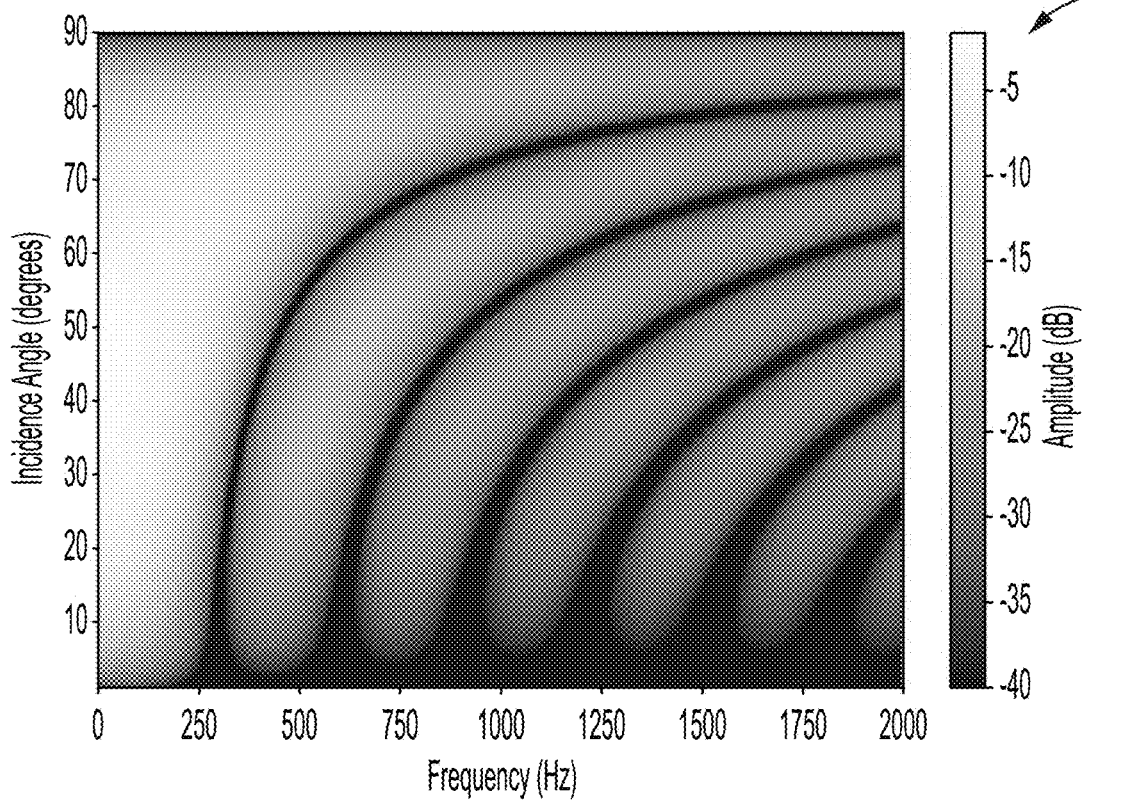
FIG. 14 is an amplitude plot of a combined sensitivity and wavenumber filtering effect of a distributed acoustic sensor response for an S wave according to some aspects of the disclosure.

FIG. 14 is an amplitude plot 1400 of a combined sensitivity and wavenumber filtering effect of a distributed acoustic sensor response for an S wave according to some aspects of the disclosure. As illustrated, lighter areas of the amplitude plot 1300 indicate incidence angles and frequencies that provide high quality responses to the microseismic event 202, while the darker areas of the amplitude plot 1300 indicate incidence angles and frequencies that provide low quality responses to the microseismic event 202. In operation, the computing device 116 may filter out responses from the distributed acoustic signal that fall within the darker areas of the amplitude plot 1300 when generating the aggregate spectrum that is fit to the Brune model.

Figure 15:
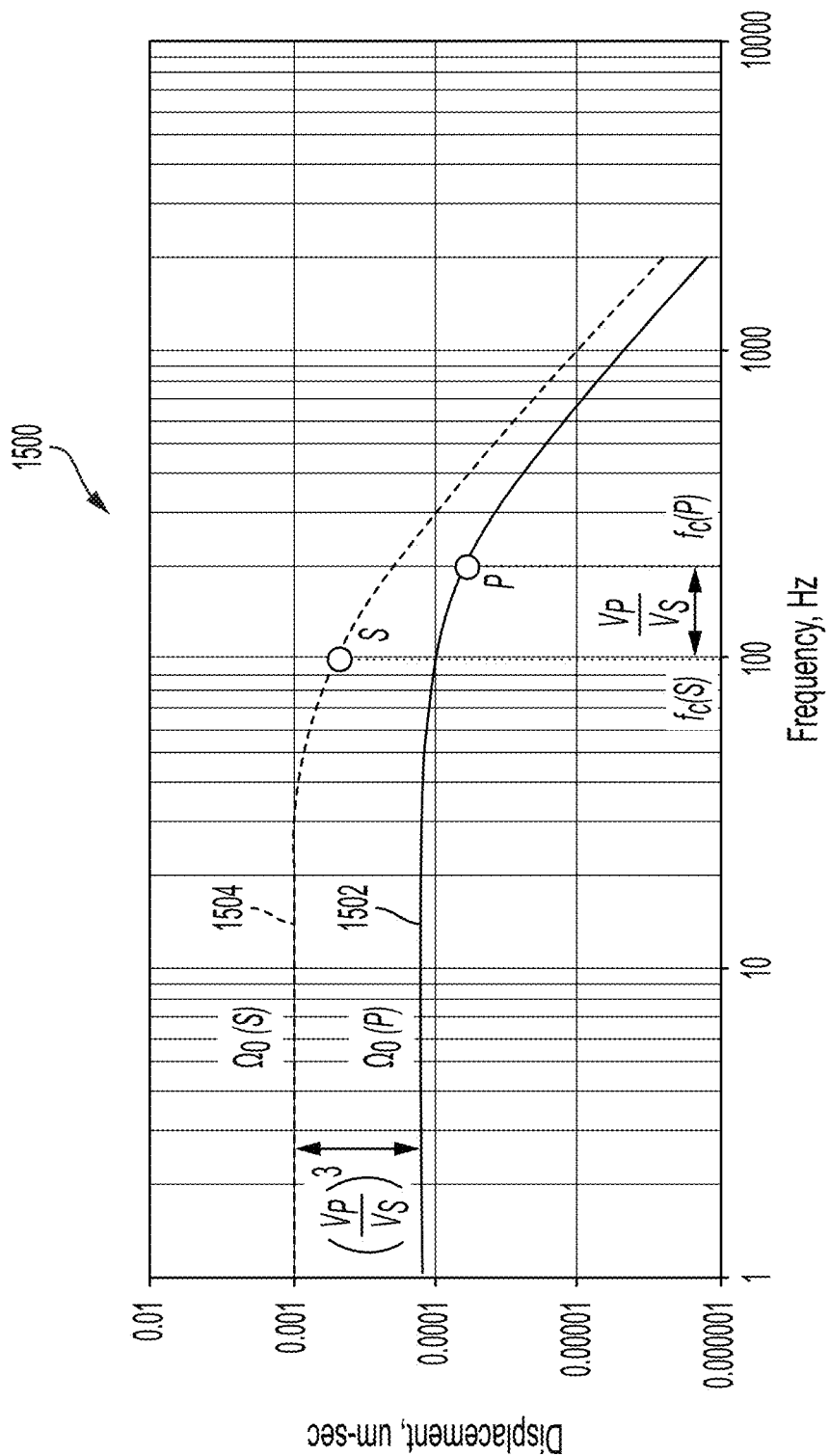
FIG. 15 is a plot of a Brune displacement spectra scaling of a P wave and an S wave according to some aspects of the disclosure.

FIG. 15 is a plot 1500 of a Brune displacement spectra scaling of a line 1502 representing a P wave response and a line 1504 representing an S wave response according to some aspects of the disclosure. To scale a low frequency level of a displacement spectrum (i.e., a displacement value for $\Omega_0$), the low frequency level is multiplied or divided by $$\left(\frac{V_P}{V_S}\right)^3.$$

For example, when me velocity of the P wave is 5000 m/s, and the velocity of the S wave is 3000 m/s, the low frequency level of the P wave $\Omega_0(P)$ is multiplied by 4.62 to scale to the low frequency level of the S wave $\Omega_0(S)$. Alternatively, the low frequency level of the S wave $\Omega_0(S)$ may be divided by 4.62 to scale to the low frequency level of the P wave $\Omega_0(P)$.

To scale the corner frequencies ($f_c$), the corner frequency values are multiplied or divided by $$\frac{V_P}{V_S}.$$

For example, when the velocity of the P wave is 5000 m/s, and the velocity of the S wave is 3000 m/s, the corner frequency of the P wave $f_c(P)$ is divided by 1.67 to scale to the corner frequency of the S wave $f_c(S)$. Alternatively, the corner frequency of the S wave $f_c(S)$ may be multiplied by 1.67 to scale to the corner frequency of the P wave $f_c(P)$. By scaling the response to the S wave to the response to the P wave or scaling the response to the P wave to the response to the S wave, the sensitivity of the response data is improved such that a larger amount of data will meet the acceptance threshold when compared to data only associated with the P wave response or data only associated with the S wave response.

Figure 16:
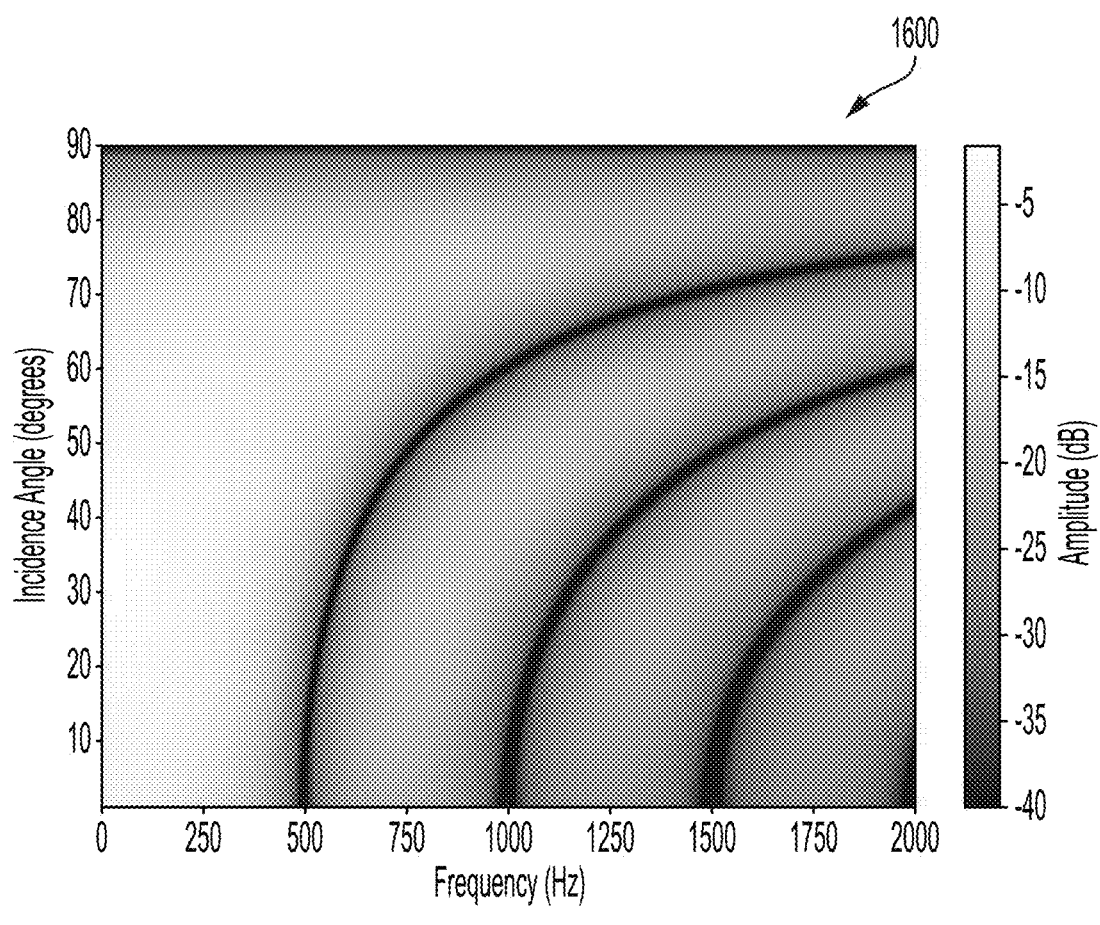
FIG. 16 is an amplitude plot of sensitivity and wavenumber filtering effect of a distributed acoustic sensor response to a P wave and a distributed acoustic sensor response to an S wave after scaling and combining the responses according to some aspects of the disclosure.

FIG. 16 is an amplitude plot 1600 of a sensitivity and wavenumber filtering effect of a distributed acoustic sensor response to a P wave and a distributed acoustic sensor response to an S wave after scaling and combining the responses according to some aspects of the disclosure. As discussed above with respect to FIG. 15, scaling and combining the distributed acoustic sensor responses to the P wave and the S wave may result in an improvement in the data that meets the acceptance threshold over data only associated with the P wave or only associated with the S wave.

Figure 17:
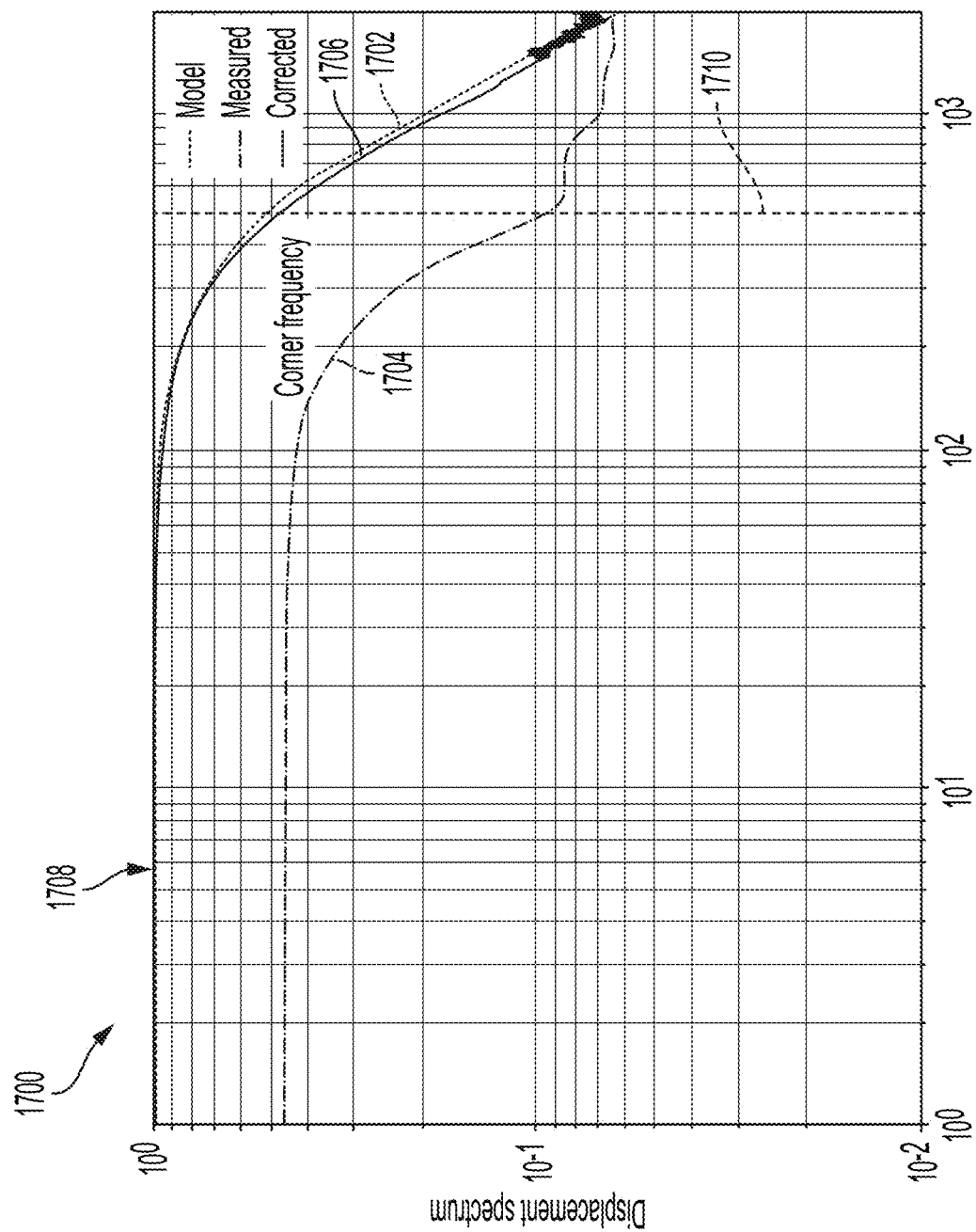
FIG. 17 is a plot of a Brune spectrum model, an observed root-mean-square (RMS) spectrum not corrected for noise associated with a distributed acoustic sensor, and an observed RMS spectrum corrected for the noise associated with the distributed acoustic sensor according to some aspects of the disclosure.

FIG. 17 is a plot 1700 of a Brune spectrum model 1702, an observed root-mean-square (RMS) spectrum 1704 not corrected for noise associated with a distributed acoustic sensor, and an observed RMS spectrum 1706 corrected for the noise associated with the distributed acoustic sensor according to some aspects of the disclosure. Using the observed RMS spectrum 1706 that is corrected for the noise associated with the distributed acoustic sensor, the event characteristics of the microseismic event 202 may be estimated. For example, the low frequency level 1708 (i.e., $\Omega_0$) may be used to determine an event magnitude of the microseismic event 202 according to equation 4, and the corner frequency 1710 (i.e., $f_c$) may be used to determine a size of shear failure of the microseismic event 202 according to equation 5. Other event characteristics of the microseismic event 202 may also be estimated based on the observed RMS spectrum 1706. Once the event characteristics are determined, the computing device 116 may control a hydraulic fracturing operation performed by the hydraulic fracturing system 118 using the event characteristics to improve the performance of the hydraulic fracturing operation.

In some aspects, a system for using distributed acoustic sensors to estimate a unique location of a microseismic event is provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a well system comprising: a fiber optic cable positionable downhole along a length of a wellbore; and a reflectometer communicatively coupleable to the fiber optic cable to: detect and locate a microseismic event using strain detected in reflected optical signals received from the fiber optic cable; compute a set of spectra for waveforms of the microseismic event; aggregate each spectrum from the set of spectra that meet an acceptance threshold to generate an aggregate spectrum; and apply a fault source model to the aggregate spectrum to determine a magnitude of the microseismic event.

Example 2 is the well system of example 1, further comprising: a hydraulic fracturing system that is controllable using the microseismic event magnitude.

Example 3 is the well system of examples 1-2, wherein the fault source model comprises a Brune spectrum model.

Example 4 is the well system of examples 1-3, wherein the reflectometer is further communicatively coupleable to the fiber optic cable to filter noise from the set of spectra.

Example 5 is the well system of examples 1-4, wherein the strain is detectable on a first portion of the fiber optic cable positioned along a horizontal portion of the wellbore.

Example 6 is the well system of examples 1-5, wherein the reflectometer is communicatively coupleable to the fiber optic cable to compute the set of spectra for waveforms of the microseismic event by: scaling a set of P wave spectra to S wave spectra values or scaling a set of S wave spectra to P wave values.

Example 7 is the well system of examples 1-6, further comprising: a second wellbore; and a hydraulic fracturing system positionable to control a hydraulic fracturing operation within the second wellbore, wherein the hydraulic fracturing operation within the second wellbore is performable to generate the microseismic event that generates the strain detectable in the reflected optical signals.

Example 8 is the well system of examples 1-7, wherein the wellbore comprises a vertical wellbore.

Example 9 is the well system of examples 1-8, wherein the reflectometer is further communicatively coupleable to the fiber optic cable to apply the fault source model to the aggregate spectrum to determine the magnitude of the microseismic event by: determining a low frequency level of the aggregate spectrum.

Example 10 is a method comprising: computing a set of spectra for waveforms of a microseismic event using data received from a distributed acoustic sensor; aggregating each spectrum that meets an acceptance threshold from the set of spectra to generate an aggregate spectrum; determining a microseismic event magnitude by applying a fault source model to the aggregate spectrum; and controlling a hydraulic fracturing system using the microseismic event magnitude.

Example 11 is the method of example 10, wherein aggregating each spectrum comprises: determining each displacement spectrum value that meets the acceptance threshold by analyzing a displacement spectrum value of each frequency at multiple sensor sections of the distributed acoustic sensor; and adding each displacement spectrum value of a specific frequency that meets the acceptance threshold to a root mean square averaging pool for the specific frequency.

Example 12 is the method of examples 10-11, wherein applying the fault source model to the aggregate spectrum comprises fitting a Brune spectrum model to the aggregate spectrum.

Example 13 is the method of examples 10-12, further comprising: scaling and combining P wave spectra of the microseismic event and S wave spectra of the microseismic event to generate the set of spectra.

Example 14 is the method of examples 10-13, wherein data received from the distributed acoustic sensor comprises a location of the microseismic event and strain measurement from a fiber optic cable of the distributed acoustic sensor.

Example 15 is a non-transitory computer-readable medium having program code that is stored thereon, the program code executable by one or more processing devices for performing operations comprising: receiving a signal from a reflectometer representing strain along a length of a fiber optic cable positioned within a wellbore, wherein the strain results from seismic waves of a microseismic event; detecting and locating the microseismic event using strain detected in the reflected optical signals; computing a set of spectra for waveforms of the microseismic event; aggregating each spectrum from the set of spectra that meet an acceptance threshold to generate an aggregate spectrum; and determining a microseismic event magnitude by applying a fault source model to the aggregate spectrum.

Example 16 is the non-transitory computer-readable medium of example 15, wherein the operations further comprise: determining a size of a shear failure of the microseismic event based on a corner frequency of the fault source model applied to the aggregate spectrum.

Example 17 is the non-transitory computer-readable medium of examples 15-16, wherein the microseismic event magnitude is determined from a low frequency level of the fault source model applied to the aggregate spectrum.

Example 18 is the non-transitory computer-readable medium of examples 15-17, wherein the operations further comprise: scaling a set of P wave spectra to S wave spectra values or scaling a set of S wave spectra to P wave values.

Example 19 is the non-transitory computer-readable medium of examples 15-18, wherein the operations further comprise: controlling a hydraulic fracturing system using the microseismic event magnitude.

Example 20 is the non-transitory computer-readable medium of examples 15-19, wherein the fault source model comprises a Brune spectrum model.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A well system comprising:
    a fiber optic cable positionable downhole along a length of a wellbore; and
    a reflectometer communicatively coupleable to the fiber optic cable to:
        detect and locate a microseismic event using strain detected in reflected optical signals received from the fiber optic cable;
        compute a set of spectra for waveforms of the microseismic event;
        aggregate each spectrum from the set of spectra that meet an acceptance threshold to generate an aggregate spectrum, wherein aggregating each spectrum involves determining each displacement spectrum value that meets the acceptance threshold by analyzing a displacement spectrum value of each frequency at multiple sensor sections of the fiber optic cable; and
        apply a fault source model to the aggregate spectrum to determine a magnitude of the microseismic event.

2. The well system of claim 1, further comprising:
    a hydraulic fracturing system that is controllable using the magnitude of the microseismic event.

3. The well system of claim 1, wherein the fault source model comprises a Brune spectrum model.

4. The well system of claim 1, wherein the reflectometer is further communicatively coupleable to the fiber optic cable to filter noise from the set of spectra.

5. The well system of claim 1, wherein the strain is detectable on a first portion of the fiber optic cable positioned along a horizontal portion of the wellbore.

6. The well system of claim 1, wherein the reflectometer is communicatively coupleable to the fiber optic cable to compute the set of spectra for waveforms of the microseismic event by:

scaling a set of P wave spectra to S wave spectra values or scaling a set of S wave spectra to P wave values.

7. The well system of claim 1, further comprising:
a second wellbore; and
a hydraulic fracturing system positionable to control a hydraulic fracturing operation within the second wellbore, wherein the hydraulic fracturing operation within the second wellbore is performable to generate the microseismic event that generates the strain detectable in the reflected optical signals.

8. The well system of claim 1, wherein the wellbore comprises a vertical wellbore.

9. The well system of claim 1, wherein the reflectometer is further communicatively coupleable to the fiber optic cable to apply the fault source model to the aggregate spectrum to determine the magnitude of the microseismic event by:
determining a low frequency level of the aggregate spectrum.

10. A method comprising:
computing a set of spectra for waveforms of a microseismic event using data received from a distributed acoustic sensor;
aggregating each spectrum from the set of spectra that meet an acceptance threshold to generate an aggregate spectrum, wherein aggregating each spectrum involves determining each displacement spectrum value that meets the acceptance threshold by analyzing a displacement spectrum value of each frequency at multiple sensor sections of the distributed acoustic sensor;
determining a microseismic event magnitude by applying a fault source model to the aggregate spectrum; and
controlling a hydraulic fracturing system using the microseismic event magnitude.

11. The method of claim 10, wherein aggregating each spectrum comprises:
adding each displacement spectrum value of a specific frequency that meets the acceptance threshold to a root mean square averaging pool for the specific frequency.

12. The method of claim 10, wherein applying the fault source model to the aggregate spectrum comprises fitting a Brune spectrum model to the aggregate spectrum.

13. The method of claim 10, further comprising:
scaling and combining P wave spectra of the microseismic event and S wave spectra of the microseismic event to generate the set of spectra.

14. The method of claim 10, wherein data received from the distributed acoustic sensor comprises a location of the microseismic event and strain measurement from a fiber optic cable of the distributed acoustic sensor.

15. A non-transitory computer-readable medium having program code that is stored thereon, the program code being executable by one or more processing devices for performing operations comprising:
receiving a signal from a reflectometer representing strain along a length of a fiber optic cable positioned within a wellbore, wherein the strain results from seismic waves of a microseismic event;
detecting and locating the microseismic event using strain detected in the reflected optical signals;
computing a set of spectra for waveforms of the microseismic event;
aggregating each spectrum from the set of spectra that meet an acceptance threshold to generate an aggregate spectrum; determining a microseismic event magnitude by applying a fault source model to the aggregate spectrum; and
determining a size of a shear failure of the microseismic event based on a corner frequency of the fault source model applied to the aggregate spectrum.

16. The non-transitory computer-readable medium of claim 15 wherein the microseismic event magnitude is determined from a low frequency level of the fault source model applied to the aggregate spectrum.

17. The non-transitory computer-readable medium of claim 15, wherein the operations further comprise:
scaling a set of P wave spectra to S wave spectra values or scaling a set of S wave spectra to P wave values.

18. The non-transitory computer-readable medium of claim 15, wherein the operations further comprise:
controlling a hydraulic fracturing system using the microseismic event magnitude.

19. The non-transitory computer-readable medium of claim 15, wherein the fault source model comprises a Brune spectrum model.

* * * * *